Oct. 15, 1929.  J. L. COLEMAN ET AL  1,731,921
MINNOW BUCKET
Filed April 2, 1928    2 Sheets-Sheet 1

WITNESSES
Guy M Spring

Inventor
JOHN L. COLEMAN and
FRANK L. E. EZZELL

By Irving L. McCathran
Attorney

Oct. 15, 1929.  J. L. COLEMAN ET AL  1,731,921
MINNOW BUCKET
Filed April 2, 1928   2 Sheets-Sheet 2
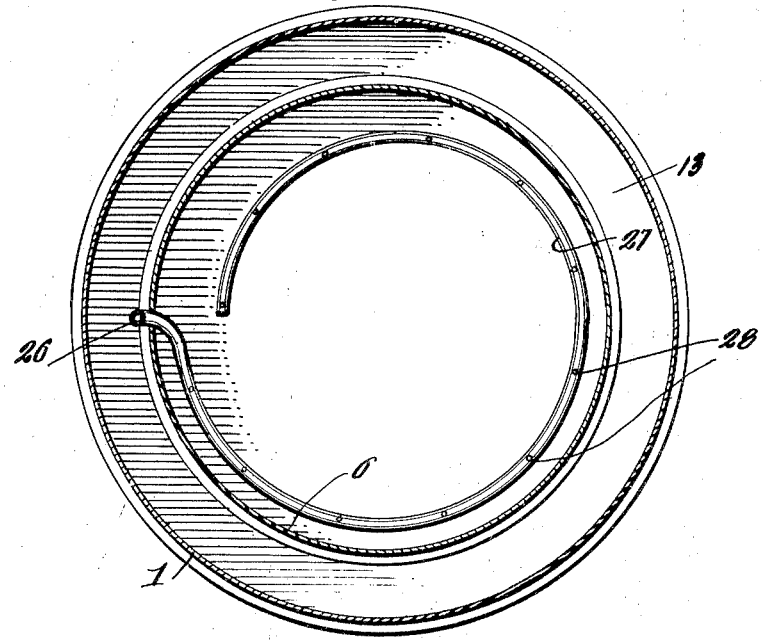
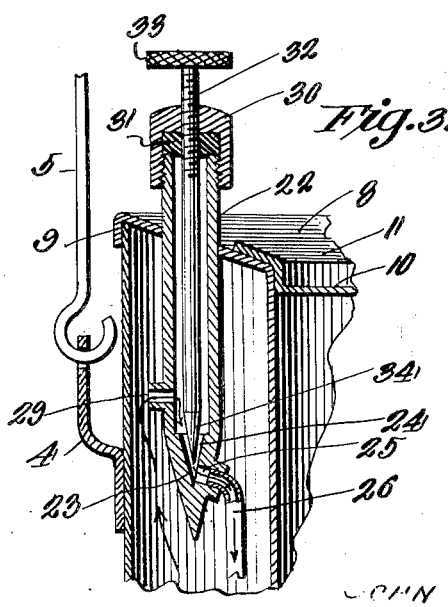

Patented Oct. 15, 1929

1,731,921

UNITED STATES PATENT OFFICE

JOHN L. COLEMAN AND FRANK L. E. EZZELL, OF OKLAHOMA CITY, OKLAHOMA; SAID COLEMAN ASSIGNOR TO J. H. HARRISON

MINNOW BUCKET

Application filed April 2, 1928. Serial No. 266,670.

This invention relates to an element of a fishing outfit and pertains particularly to a specially designed bucket for keeping live bait such as minnows in a healthy active condition.

The primary object of the present invention is to provide, in a manner as hereinafter set forth, a live bait or minnow bucket having means whereby air under pressure can be kept convenient for admission into the water containing receptacle of the bucket for the purpose of reaerating the same.

The present invention broadly contemplates the provision of a water containing receptacle within a bucket and spaced from the wall of the same, with the space between the bucket body and the inner receptacle covered and made air tight. An air pump is mounted in the cover portion of the space between the water receptacle and bucket body whereby air under pressure can be forced into said space and a control valve is also mounted in the covered portion which is employed to control the admission of air to a pipe line leading from the compressed air space into the water containing receptacle. By this means air can be maintained under pressure and admitted to the water space as desired for the purpose of renewing the supply of oxygen in the water.

The invention will be best understood from a consideration of the following detailed description taken in connection with the accompanying drawings forming a part of the present invention, with the understanding, however, that the invention is not confined to any strict conformity with the showing of the drawings but may be changed or modified so long as such changes or modifications mark no material departure from the salient features of the invention as expressed in the appended claims.

In the drawings:

Figure 2 is a transverse section taken upon the line 2—2 of Figure 1.

Figure 3 is an enlarged detailed sectional view of the air control valve.

Figure 1:
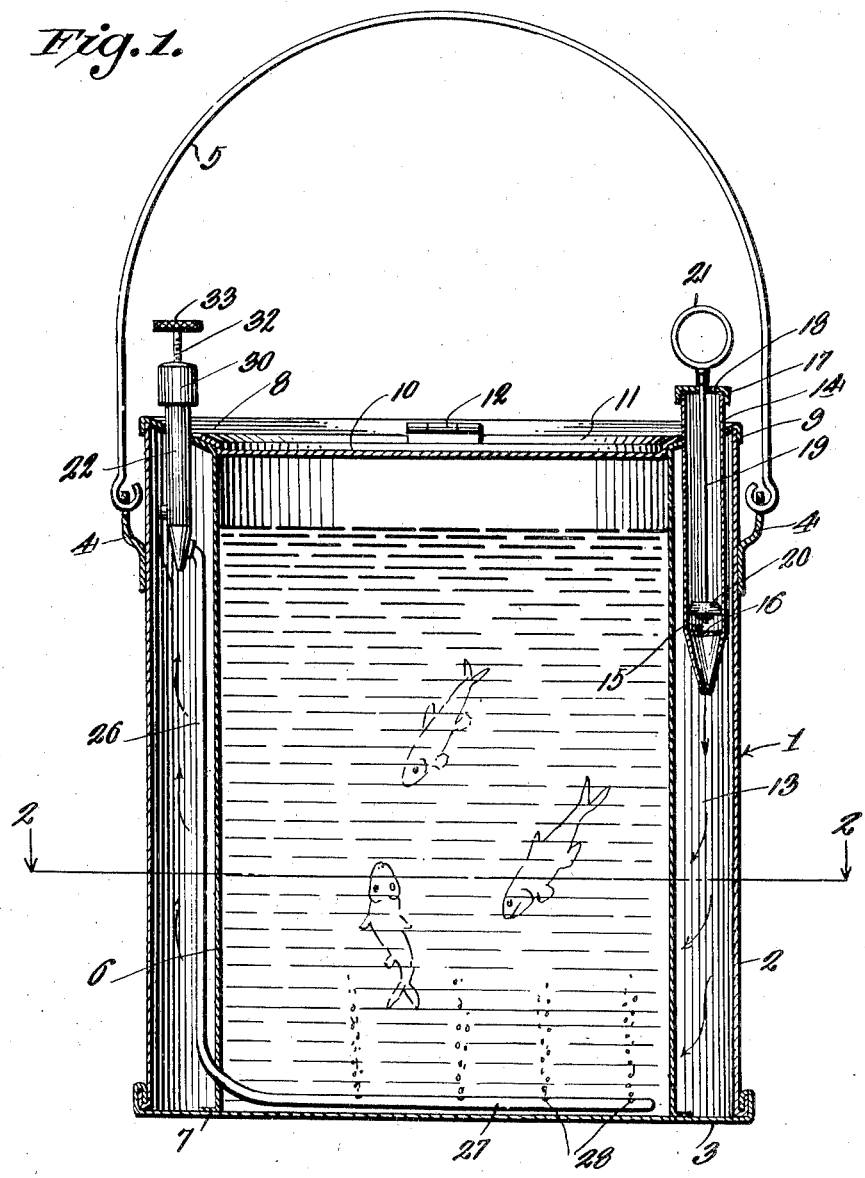
Figure 1 shows the minnow bucket embodying the present invention in central longitudinal section.

Referring now to the drawings in detail wherein like numerals of reference indicate corresponding parts throughout the several views, the numeral 1 indicates generally the bucket structure having the usual side wall 2 and bottom 3. Attached to the sides of the bucket wall at diametrically opposite points, are the bail ears 4 to which are attached the ends of the handle or bail 5.

Within the bucket 1 is a cylindrical receptacle 6 which constitutes a water receptacle, this receptacle 6 being substantially the same height as the bucket having the lower edge provided with a flange 7 which is secured to the bottom 3 of the bucket and made air and water tight. The top of the water receptacle 6 is flared outwardly and upwardly forming the annular flange 8 which extends to and overlies the top edge of the wall 2 of the bucket proper, the edge of this flange being turned downwardly as indicated at 9 against the outer face of the bucket wall 2 and secured thereto in air tight contact.

The water receptacle or wall 6 is provided with a closure lid 10 which has the offset lateral flange portion 11 which overlies a portion of the face of the flange 8 as shown in Figure 1 preventing the lid from falling into the receptacle 6. A hinge 12 connects the lid 10 with the flange 8 in the usual manner as shown.

Extending through the flange 8 into the compartment 13 which is set up between the wall 2 of the bucket and the wall of the water receptacle 6, and which is airtight, is an air pump cylinder 14 the lower end of which has diaphgram 15 therein, the central portion of which is provided with an aperture normally closed by a downwardly opening valve 16. The upper end of the cylinder is closed by the removable cap 17 and is provided with an air inlet aperture 18 and a central aperture through which the plunger rod 19 passes to the interior of the cylinder, this rod carrying upon its inner end a plunger 20 of the type usually employed in air pumps of this character. The outer end of the rod carries a ring 21 to facilitate holding the rod while pumping air into the chamber 13.

In addition to the pump cylinder 14 there extends through the flange 8, preferably diametrically opposite the cylinder 14, an elongated valve cylinder 22 the lower end of which is closed and cone shaped as indicated at 23 forming upon the interior of the cylinder the tapered recess 24 which forms a seat for a needle valve herein described.

Opening from the lower portion of the tapered recess 24 is an outlet passage 25 which opens into a pipe line 26 which leads through the wall of the water receptacle 6 adjacent the bottom thereof and is formed to provide a coil 27 within the water receptacle, this coil being provided with outlet apertures 28.

The wall of the valve cylinder 22 at a substantial distance above the tapered recess 24 is provided with an inlet passage 29 through which air under pressure passes from the chamber 13 into the valve cylinder.

The upper end of the valve cylinder is closed by the cap 30 which is threaded thereon and has suitable packing means 31 for preventing escape of the compressed air, and through this cap there extends a valve stem 32 which is in threaded connection with the cap and carries a knurled head 33 upon the outside of the cylinder 22. The inner end of the stem 32 is needle shaped as at 34 and is designed to snugly fit into the tapered recess 24 to close the outlet passage 25.

From the foregoing description it will be readily seen that if the needle valve 32 is closed the air pump can be actuated to force air under pressure into the chamber 13 and when it is desired to reareate water within the receptacle 6 it is only necessary to slightly open the needle valve to permit the air to pass through the pipe 26 from which it discharges through the apertures 28 in the lower part of the receptacle 6.

Having thus described our invention what we claim is:

1. A minnow bucket of the character described, comprising a bucket including a bottom and a side wall, a water receptacle within said bucket spaced from said side wall, an integral flange surrounding the upper portion of said water receptacle and covering the space between the same and the bucket wall setting up an air tight chamber, a pump structure extending from the exterior of the bucket through said flange into said air chamber, a valve member and an air line controlled by said valve member leading from said compressed air chamber into said water receptacle.

2. A minnow bucket of the character described, comprising a bucket including a bottom and a side wall, a water receptacle within said bucket spaced from said side wall, an integral flange surrounding the upper portion of said water receptacle and covering the space between the same and the bucket wall setting up an air tight chamber, a pump structure extending from the exterior of the bucket through said flange into said air chamber, a valve member and an air line controlled by said valve member leading from said compressed air chamber into said water receptacle, said air line being arranged in the bottom of said receptacle to discharge air upwardly to the contents thereof.

3. A live bait container, comprising a bucket having a bottom and side wall, a cylindrical water receptacle within said bucket and spaced from the wall thereof, a lateral surrounding flange at the upper end of said water receptacle connecting with the wall of said bucket closing the space between the wall and water receptacle to set up a compressed air chamber, a pump element carried by and extending through said flange into said compressed air chamber, an air pipe line leading from said compressed air chamber through the wall of said water receptacle to and discharging into the water receptacle at the bottom of the same, and a needle valve controlling the admission of compressed air from said chamber into said pipe line.

In testimony whereof we affix our signatures.

JOHN L. COLEMAN.
FRANK L. E. EZZELL.